United States Patent [19]
Morita et al.

[11] Patent Number: 5,847,351
[45] Date of Patent: Dec. 8, 1998

[54] ELECTRODE FEEDING APPARATUS FOR ELECTRIC-DISCHARGE MACHINING

[75] Inventors: Hiromichi Morita, Kariya; Hideyuki Iiboshi, Tokai; Tetsuji Sanada; Takashi Shimizu, both of Kariya, all of Japan

[73] Assignee: Denso Corporation, Japan

[21] Appl. No.: 811,013

[22] Filed: Mar. 4, 1997

[30] Foreign Application Priority Data

Mar. 4, 1996 [JP] Japan ................................. 8-045948

[51] Int. Cl.⁶ .................................................. B23H 1/02
[52] U.S. Cl. ................................. 219/69.16; 219/69.19
[58] Field of Search .......................... 219/69.16, 69.13, 219/69.19

[56] References Cited

U.S. PATENT DOCUMENTS

| | | | |
|---|---|---|---|
| 4,415,791 | 11/1983 | Yamada et al. | 219/69.16 |
| 4,484,051 | 11/1984 | Yamada et al. | 219/69.16 |
| 4,495,394 | 1/1985 | McGregor et al. | 219/69.16 |
| 4,760,233 | 7/1988 | Obara | 219/69.16 |
| 4,767,903 | 8/1988 | Sciaroni | 219/69.13 |
| 4,874,979 | 10/1989 | Rapp . | |

FOREIGN PATENT DOCUMENTS

| | | |
|---|---|---|
| 57-21227 | 2/1982 | Japan . |
| 57-132930 | 8/1982 | Japan . |
| 62-88514 | 4/1987 | Japan . |
| 62-88519 | 4/1987 | Japan . |
| 63-237813 | 10/1988 | Japan . |

OTHER PUBLICATIONS

Electric Discharge Machining Device, 63–207510, Iwahana, Aug. 1988, Aisan Ind Co Ltd, JP (Abstract only).

*Primary Examiner*—Geoffrey S. Evans
*Attorney, Agent, or Firm*—Cushman Darby & Cushman Intellectual Property Group of Pillsbury Madison & Sutro, LLP

[57] ABSTRACT

An electrode feeding apparatus for electric-discharge machining by discharging between an electrode and a workpiece in order to machine the workpiece includes an occurrence frequency detecting unit for detecting the occurrence frequency of short-circuit current flowing when the electrode contacts the workpiece and a penetration detecting unit for detecting penetration by the electrode to the workpiece based on the occurrence frequency. According to the present invention, it is possible to detect with high precision penetration by the electrode into the workpiece by utilizing the difference between an occurrence frequency of short-circuit current during electrode discharge machine and the occurrence frequency of the short-circuit current when the electrode has penetrated the workpiece.

2 Claims, 9 Drawing Sheets

ELECTRODE FEEDING APPARATUS FOR ELECTRIC-DISCHARGE MACHINING

BACKGROUND OF THE INVENTION

1. Field of the Invention

The present invention relates to an electrode feeding apparatus for electric-discharge machining. This apparatus is advantageously used for an electric-discharge machining apparatus which machines a workpiece using an electrode.

2. Description of the Related Art

Conventionally, there are known electric-discharge machining apparatuses for supplying a high voltage between the electrode and the workpiece, and discharge therebetween in order to machine the workpiece. For example, these apparatuses are disclosed in the following three documents, i.e., Japanese Unexamined Patent Publication (kokai) No. 57-132929, Japanese Unexamined Patent Publication (Kokai) No. 61-274813, and Japanese Unexamined Patent Publication (Kokai) No. 63-207510.

One type of conventional electric-discharge machining apparatus has a structure in which the electrode is held by an electrode holder. The electrode holder comprises a scale for detecting a position thereof so that it is possible to detect the position of the electrode holder in accordance with a reading of the scale. In these electric-discharge machining apparatuses, in order to detect the fact that the electrode has penetrated the workpiece, first, the electrode is contacted to the workpiece before machining, and, second, a contact point of the electrode to the workpiece is determined as a starting point. Further, when the electrode holder moves from the contact point to the end of the workpiece in accordance with thickness thereof, the determination is performed as the electrode has penetrated the work.

In a penetration detecting method used for the electric-discharge machining apparatus having the electrode holder as explained above, a moved distance of the electrode holder is adjusted by considering consumption of the electrode during the electric-discharge machining, and the time of the penetration is detected based on the consumption of the electrode.

However, for example, when using an electrode which is heavily and quickly consumed and in which the change of consumption is unstable, such as an electrode made of copper, it is very difficult to precisely detect the time of penetration of the electrode. Further, in a method for moving the electrode in accordance with expansion and contraction of a piezoelectric element without use of the electrode holder, it is very difficult to detect the position of the electrode by using the scale which is used for the electrode holder.

Further, as still another method, there is an electric-discharge machining apparatus for electrically detecting penetration of the electrode either by electrically detecting recovery of insulation between the electrode and the workpiece, or by comparing a changing pattern of a servo voltage with a desired voltage pattern in a power unit for supplying a desired machining voltage between the electrode and the workpiece. However, there is a problem in that this apparatus has poor precision of detection of penetration of the electrode.

SUMMARY OF THE INVENTION

The object of the present invention is to provide an electrode feeding apparatus for electric-discharge machining which can detect, with high precision, the time when an electrode has penetrated a workpiece.

In accordance with the present invention, there is provided an electrode feeding apparatus for electric-discharge machining by discharging between an electrode and a workpiece in order to machine the workpiece including:

an occurrence frequency detecting unit for detecting the occurrence frequency of short-circuit current flowing when the electrode contacts the workpiece; and a penetration detecting unit for detecting penetration of the electrode to the workpiece based on the occurrence frequency.

In a preferred embodiment, the penetration detecting unit determines penetration of the electrode by detecting a reduction in the occurrence frequency of the short-circuit current after the electrode has penetrated the workpiece.

In another preferred embodiment, the penetration detecting unit determines penetration of the electrode in such a way that the electrode contacts the workpiece before electric-discharge machining; a contact point on the workpiece corresponds to a position of an electric holder which holds the electrode; the position of an electric holder is set as a starting point of measurement; and the penetration detecting unit determines penetration of the electrode when the electric holder moves the thickness to be machined of the workpiece from the starting point during electric-discharge machining.

According to the electrode feeding apparatus for electric-discharge machining of the present invention, it is possible to detect, with high precision, the penetration of the electrode into the workpiece by utilizing the difference between an occurrence frequency of short-circuit current during electric-discharge machining and the occurrence frequency of the short-circuit current when the electrode has penetrated the workpiece.

Further, it is possible to detect with higher precision the penetration of the electrode into the workpiece in accordance with a moved distance of the electrode holder which holds the electrode.

BRIEF DESCRIPTION OF THE DRAWINGS

In the drawings:

FIGS. 8A to 11B are views for comparing the prior art with the present invention.

DESCRIPTION OF THE PREFERRED EMBODIMENTS

The present invention will be explained in detail with reference to the attached drawings.

Before describing preferred embodiments, the system using the first embodiment will be explained in detail below.

Figure 1:
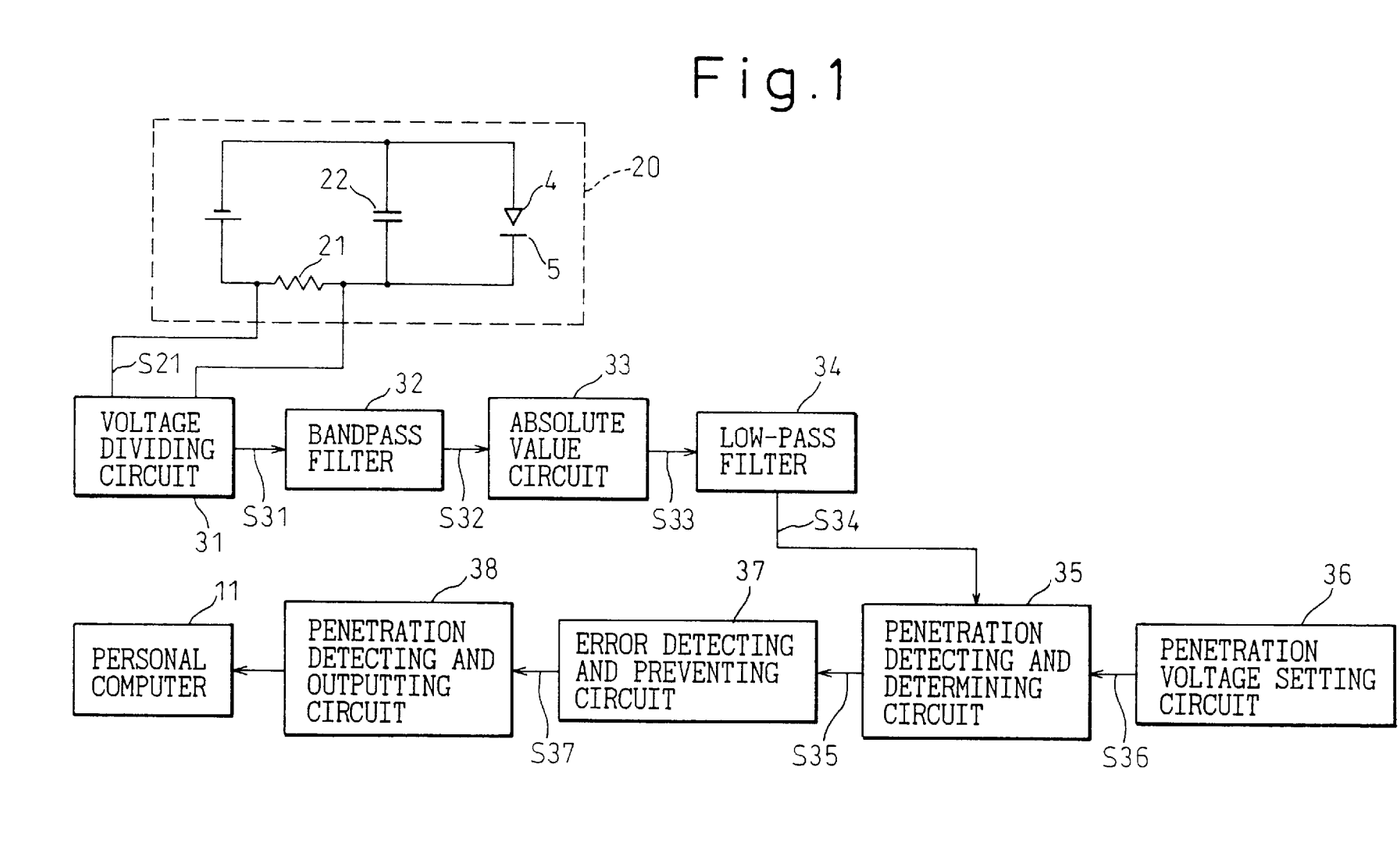
FIG. 1 is a block diagram of a penetration detecting circuit according to a first embodiment of the present invention.
Figure 2:
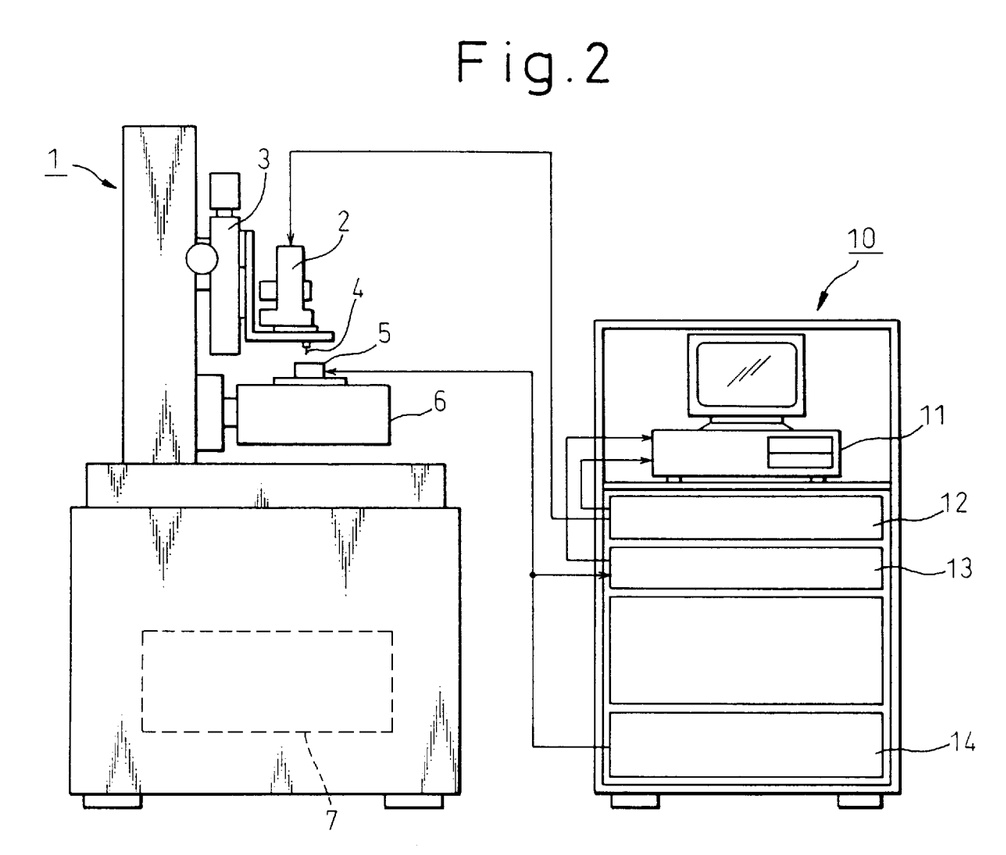
FIG. 2 is a structural view of a system using the first embodiment shown in FIG. 1.

FIG. 2 is the structural view of the system using the first embodiment shown in FIG. 1. In FIG. 2, reference number 1 denotes an electric-discharge machining apparatus, 2 an electrode feeding apparatus, 3 a numerical control (NC) shaft, 4 an electrode, 5 a workpiece, 6 a workpiece base, and 7 a machining-fluid supplying apparatus. Further, reference number 10 denotes a control unit used for electric-discharge machining, 11 a personal computer for controlling the apparatus, 12 a drive amplifier, 13 a penetration detecting apparatus, and 14 a power source for electric-discharge machining.

The electrode feeding apparatus 2 for electric-discharge machining is mounted to the NC shaft 3 of the electric-discharge machining apparatus 1. The electrode 4 used for electric-discharge machining is mounted to the electrode feeding apparatus 2 so as to face toward the workpiece 5 which is mounted on the workpiece base 6.

The electrode feeding apparatus 2 includes a piezoelectric element (not shown), and the electrode 4 is moved to the workpiece 5 in accordance with expansion and contraction of the piezoelectric element itself. Further, the machining-fluid supplying apparatus 7, which is provided to the lower portion of the electric-discharge machining apparatus 1, is formed by a pump, a filter, a tank, etc., in order to supply the machining-fluid to the workpiece 5 during the electric-discharge machining.

The personal computer 11, which is provided in the control unit 10, generates a piezoelectric drive signal to be sent to the piezoelectric element so as to keep a predetermined position of the electrode 4 for the workpiece 5 so that a large amount of discharge current can flow between the electrode 4 and the workpiece 5. The drive amplifier 12 amplifies the piezoelectric drive signal generated by the personal computer 11 to a high voltage. The penetration detecting apparatus 11 receives the current which flows between the electrode 4 and the workpiece 5, and sends a penetration detecting signal to the personal computer 11.

The power source 14 supplies the high voltage for electric-discharge machining between the electrode 4 and the workpiece 5. The personal computer 11 monitors the supply voltage, controls expansion and contraction of the piezoelectric element so as to keep the discharge current at a high level, and keep the predetermined position of the electrode 4.

When performing the electric-discharge machining, since a gap between the electrode 4 and the workpiece 5 is very small and the workpiece 5 exists in the direction to which the electrode 4 moves, the short-circuit current caused by contact between the electrode 4 and the workpiece 5 occurs during electric-discharge machining.

Next, the operation of the penetration detecting circuit in FIG. 1 will be explained in detail with reference to FIGS. 1, 3 and 4.

FIG. 1 is a block diagram of a penetration detecting circuit according to the first embodiment of the present invention. FIG. 3 is an explanatory view for explaining movement of the electrode in the first embodiment shown in FIG. 1, and FIG. 4 is a characteristic view for explaining current flowing between the electrode and the workpiece in the first embodiment shown in FIG. 1.

In FIG. 1, reference number 20 denotes as RC type discharge circuit which includes a charge resistor 21, a condenser 22, the electrode 4 and the workpiece 5. Reference number 21 denotes a voltage dividing circuit, 32 a bandpass filter, 33 an absolute value circuit, 34 a low-pass filter, 35 a penetration detecting and determining circuit, 36 a penetration voltage setting circuit, 37 an error detecting and preventing circuit, and 38 a penetration detecting and outputting circuit. Further, reference number 11 denotes the personal computer shown in FIG. 2.

The penetration detecting circuit is mainly included in the penetration detecting apparatus 13 shown in FIG. 2. The charge resistor 21 is provided for restricting the charge current supplied to the condenser 22. The discharge current and the contact current which flow between the electrode 4 and the workpiece 5, flow in the charge resistor 21.

Figure 3:
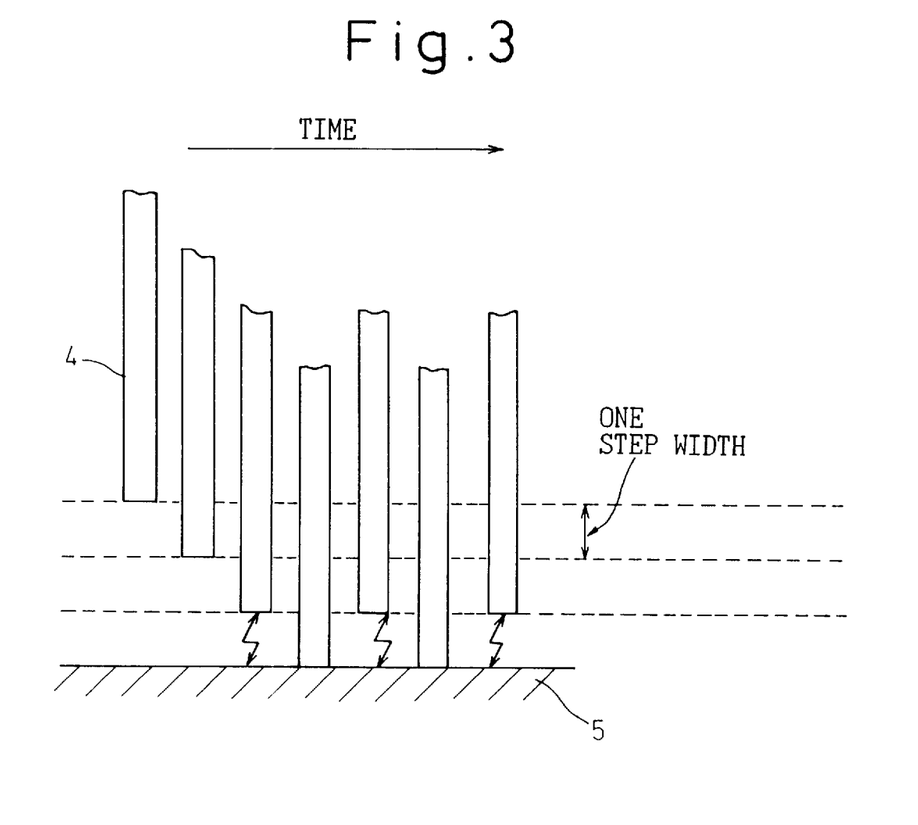
FIG. 3 is an explanatory view for explaining movement of an electrode in the first embodiment shown in FIG. 1.

As shown FIG. 3, the electrode 4 moves stepwise toward the workpiece 5 during electric-discharge machining in order to machine the workpiece 5. Accordingly, the electrode 4 contacts the workpiece 5 in accordance with these step-like operations so that, as shown by S21 in FIG. 4, the short-circuit current (pulse) having a large pulse width and long period occurs between the electrode and the workpiece. In this case, each pulse having a narrow width represents a discharge current (pulse). The short-circuit current occurs until the electrode 4 penetrates the workpiece 5. When the electrode 4 penetrates the workpiece 5, either the occurrence frequency of the short-circuit current becomes zero or the short-circuit current is suddenly reduced. The frequency of the short-circuit current corresponds to an electrode drive frequency.

The voltage dividing circuit 31 divides the voltage across the charge resistor 21 into a plurality of small voltages, and is formed by a plurality of series-connected resistors. The bandpass filter 32 eliminates noise by extracting frequency components at a predetermined frequency band in the signal divided by the voltage dividing circuit 31, and outputs only the signal in the vicinity of the electrode drive frequency (about 300 Hz) for the electrode feeding apparatus 2.

Figure 4:
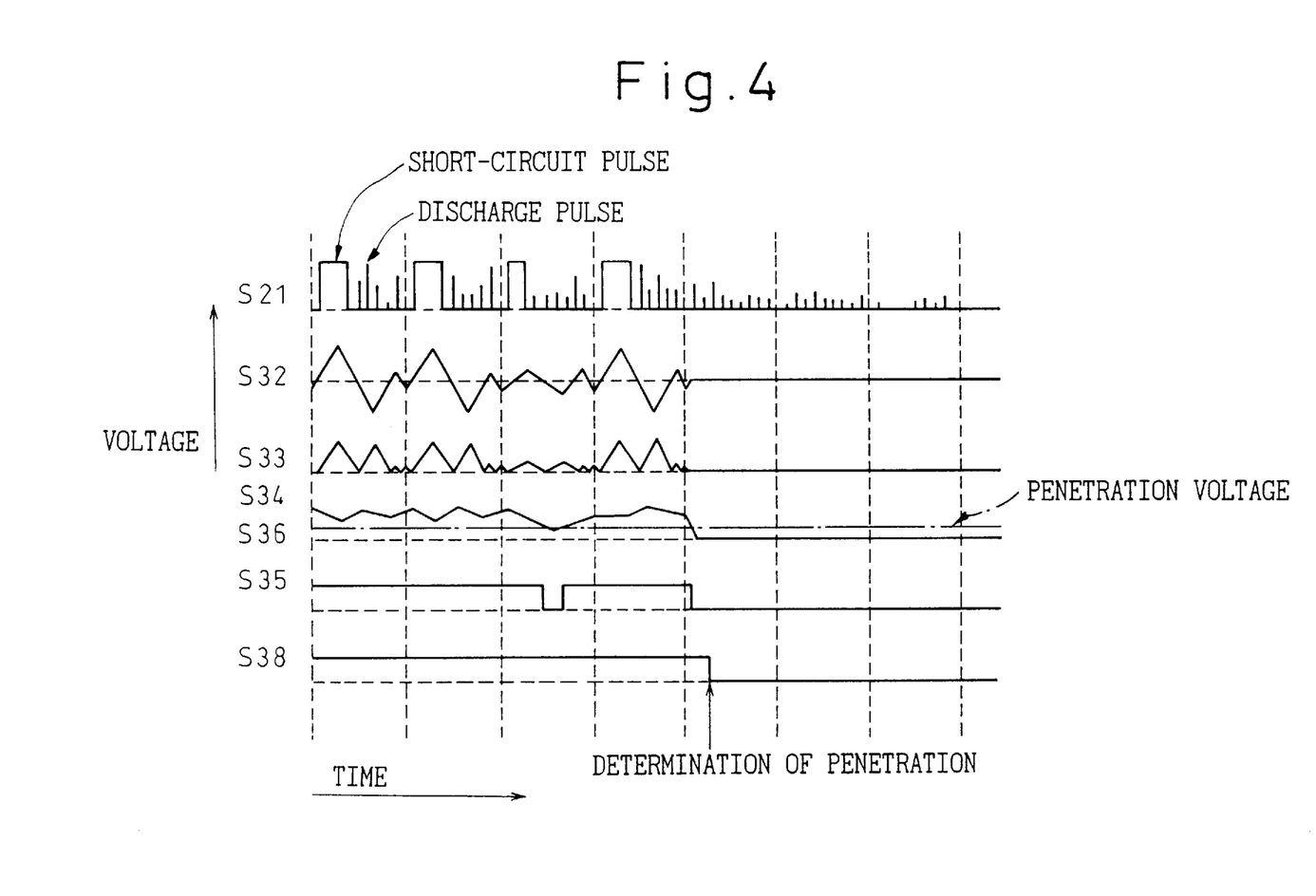
FIG. 4 is a characteristic view for explaining the current which flows between an electrode and a workpiece in the first embodiment shown in FIG. 1.

As shown by S32 in FIG. 4, an output signal S32 from the bandpass filter 32 becomes high in the timing of occurrence of the short-circuit pulse, and the occurrence frequency of the high level of the signal S32 represents the occurrence frequency of the short-circuit current.

The absolute value circuit 33 outputs an absolute value signal S33 by converting negative signals contained in the signal S32, from which the noise was already eliminated by the bandpass filter 32, to positive signals. The low-pass filter 34 outputs an averaged signal S34 by keeping low frequency components and by eliminating high frequency components in the absolute value signal S33. The signal S34 averaged by the low-pass filter 34 becomes a high level when the occurrence frequency of the short-circuit current is high, and becomes a low level when the occurrence frequency of the short-circuit current is low.

The penetration voltage setting circuit 36 outputs a penetration voltage signal S36. The penetration detecting and determining circuit 35 compares the average signal 34 with the penetration voltage signal S36, and outputs a binary signal S35 is accordance with the following conditions. That is, when the voltage of the penetration voltage signal S36 is lower than the voltage of the averaged signal S34, the penetration detecting and determining circuit 35 outputs the binary signal "LOW", and, on the contrary, when the voltage of the penetration voltage signal S36 is higher than the voltage of the averaged signal S34, the penetration detecting and determining circuit 35 outputs the binary signal "HIGH".

The error detecting and preventing circuit 37 includes a timer which is set to a predetermined time (0.01 to 0.2 second). In this case, when the binary signal "LOW" (below, LOW signal) from the penetration detecting and determining circuit 35 is shorter than the above predetermined time, the LOW signal is regarded as the binary "HIGH" signal (below HIGH signal). Accordingly, it is possible to ignore the LOW signal which occurs for a very short time caused by an unstable movement of the electrode 4, discharge noise, etc., during electric-discharge machining. Further, it is possible to prevent a mistake which takes a short-circuit signal as penetration of the electrode even if the short-circuit signal temporarily stops when machining dust is jammed between the electrode and the workpiece during electric-discharge machining.

The penetration detecting and outputting circuit 38 outputs a penetration detecting signal S38 including either a HIGH (indicates "penetration of the electrode") or a LOW (indicates "electric-discharge machining") to the personal computer 11 in accordance with the signal S37 from the error detecting and preventing circuit 37. The personal computer 11 receives the penetration detecting signal S38, and detects whether the workpiece 5 is penetrated by the electrode 4. According to the first embodiment mentioned above, a precision of detection for the position of penetration by the electrode is about ±20 $\mu$m.

Usually, in a fine machining using a thin-wire electrode, many short-circuits between the electrode and the workpiece (i.e., an inner surface of a machined hole of the workpiece) caused by vibration of the electrode occur after the electrode penetrates the workpiece. As a result, the short-circuit current occurs therebetwen so that it is very difficult to detect the penetration of the electrode. Further, this difficulty results in erroneous operation.

However, in the first embodiment of the present invention, the short-circuit signals having different frequencies are eliminated by utilizing the fact that the frequency of the short-circuit signal is equal to that of the electrode drive signal, and the penetration of the electrode to the workpiece is detected based on the occurrence frequency of the short-circuit current. At a result, it is possible to improve precision for detecting penetration of the electrode.

Figure 5:
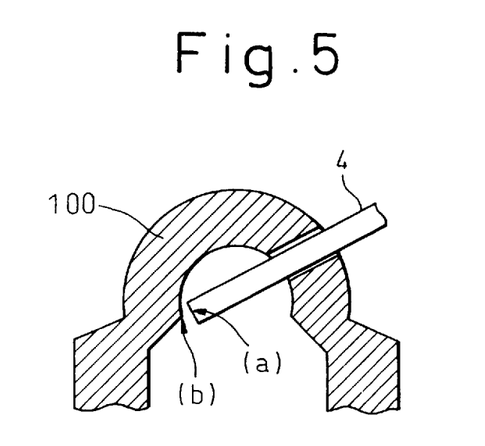
FIG. 5 is a view for explaining one example of penetration of the electrode in the first embodiment shown in FIG. 1.

FIG. 5 is a view for explaining one example of penetration of the electrode in the first embodiment shown in FIG. 1. In FIG. 5, reference number 100 denotes a nozzle to be machined, i.e., the workpiece as one example. As is obvious from the drawing, the nozzle 100 has a U-shape configuration, and it is machined by the electrode 4 from an outer surface of the right side of the nozzle 100. When the electrode 4 penetrates the nozzle 100, the end (a) of the electrode 4 approaches to an opposite surface (b) of the nozzle 100.

In this case, in a conventional electric-discharge machining method, the feeding amount of the electrode is previously set by considering an amount of consumption of the electrode. In this method, however, when the electrode is made of a material having high consumption rate and large dispersion, such as copper, it is very difficult to obtain an accurate position of the end of the electrode. That is, in the conventional art, there were problems including, for example, an insufficient penetration of the electrode (i.e., the electrode does not penetrate sufficiently the workpiece), over penetration of the electrode (i.e., the electrode penetrates the workpiece and touches the inner surface of the nozzle so that the surface was damaged), etc.

In order to solve the above problems, in the first embodiment of the present invention, the frequency components are eliminated except for the predetermined constant frequency of the short-circuit current so that it is possible to improve the precision of detection of position where the electrode penetrated the nozzle. As a result, it is possible to precisely machine the workpiece, i.e., it is possible to obtain an accurate hole in the workpiece without damaging the inner surface of the nozzle.

Further, when the electrode drive signal does not have a constant frequency, it is possible to produce a short-circuit current having the predetermined constant frequency by intentionally applying a vibration having the predetermined high frequency to the electrode.

The second embodiment will be explained in detail with reference to FIGS. 6 and 7.

Figure 6:
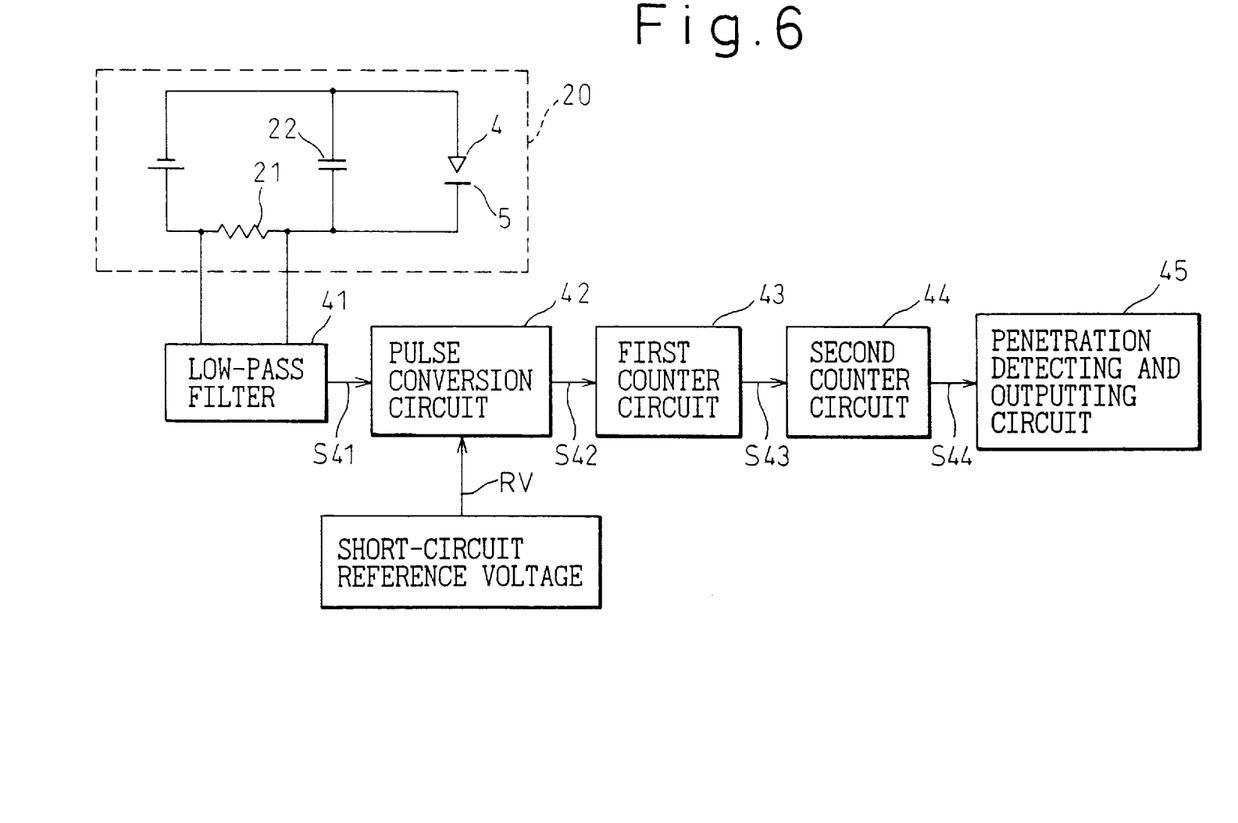
FIG. 6 is a block diagram of a penetration detecting circuit according to a second embodiment of the present invention.
Figure 7:
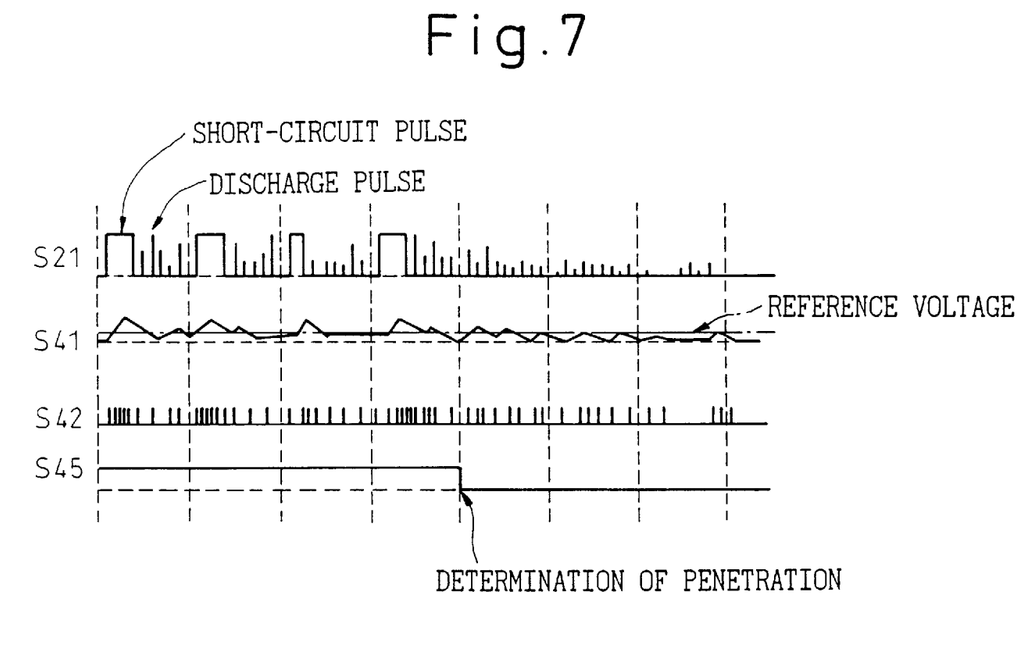
FIG. 7 is a characteristic view for explaining the current which flows between the electrode and the workpiece in the second embodiment shown in FIG. 6.

FIG. 6 is a block diagram of the penetration detecting circuit according to the second embodiment of the present invention, and FIG. 7 is a characteristic view for explaining the current flowing between the electrode and the workpiece in the second embodiment shown in FIG. 6.

In FIG. 6, as shown in FIG. 1, reference number 20 denotes the RC type discharge circuit including the charge resistor 21, the condenser 22, the electrode 4 and the workpiece 5. Reference number 41 denotes a low-pass filter, 42 a pulse conversion circuit, 43 a first counter circuit, 44 a second counter circuit, and 45 a penetration detecting and outputting circuit.

The current signal flowing in the charge resistor 21 includes the low frequency components including the short-circuit current and the high frequency components including the discharge current, and these components are mixed with each other in the current signal. The low-pass filter 41 extracts the short-circuit current signal (i.e., an analog current signal S41) by eliminating the high frequency components, and outputs the analog current signal S41 therefrom. In this case, it is possible to use a current probe instead of the charge resistor 21.

The pulse conversion circuit 42 receives a short-circuit reference voltage RV, and compares the analog current signal S41 with the short-circuit reference voltage RV. Further, the pulse conversion circuit 42 binarizes the analog current signal S41 and obtains binary signals. The binary signal represents "HIGH" when the short-circuit current flows.

The binary signal and a reference clock pulse (duty ratio is 50% and pulse width is 7 $\mu$sec) are input to an AND gate (not shown). An output pulse signal S42 generated by the AND gate includes short period portions and long period portions. In this case, the short period represents the short-circuited portion, and the long period represents the non-short-circuited portion. The output pulse signals from the AND gate are generated in predetermined numbers within predetermined time until the electrode penetrates the workpiece. On the contrary, when the electrode penetrates the workpiece, the output pulse signals from the AND gate are reduced. Accordingly, it is possible to detect the penetration of the electrode by counting the output pulse signals.

The first counter circuit 43 counts the pulse signal S42 sent from the pulse conversion circuit 42, and outputs a pulse signal S43 one-by-one every time the counted value exceeds the predetermine number within the predetermined time. The second counter circuit 44 counts the pulse signal S43 sent from the first counter circuit 43, and outputs a pulse S44 one-by-one every time the counted value exceeds the predetermined number within the predetermined time.

When the second counter circuit 44 does not output the pulse signal S44 within the predetermined time, the penetration detecting and outputting circuit 45 determines that the electrode has penetrated the workpiece, and changes the penetration detecting signal from "HIGH" to "LOW".

The first and second counter circuits 43 and 44 are provided based on the following reasons.

(1) In the actual electric-discharge machining, sometimes machining dust is jammed between the electrode and the workpiece. In this case, the short circuit current flows between the electrode and the workpiece. However, the electrode temporarily backs away during electric-discharge machining so that the machining dust is removed from the electrode or the workpiece and the short-circuit current is also cut-off. Accordingly, in order not to mistake temporary cut-off of the short-circuit current as penetration of the electrode, the second counter circuit 44 sets the predetermined time in the timer and determines penetration of the electrode only when the pulse signal is not input thereto within the predetermined time.

(2) Further, as another case, the short-circuit current flow either in the case of an accidental electrode vibration after penetration, or in the case of an accidental contact to the workpiece through the machining dust. However, since this short-circuit current is very rare and the occurrence frequency thereof is low, the short-circuit current is not counted by the second counter circuit 44. In this case, the setting time and the setting pulse number for the counter circuits 43 and 44 are different in accordance with the electrode response frequency, the machining conditions, etc.

Figure 9A:
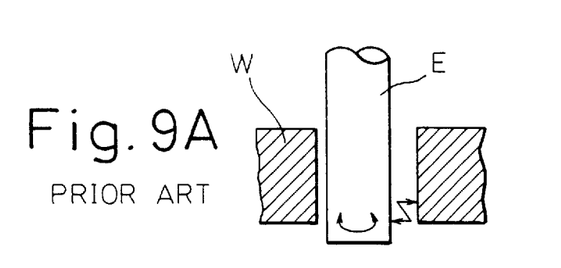
Figure 9B:
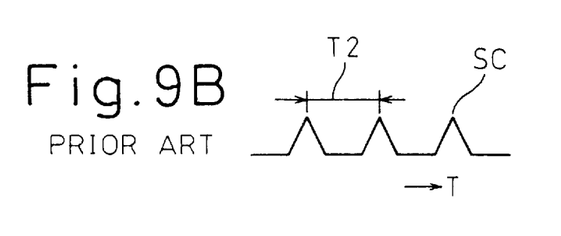
Figure 10A:
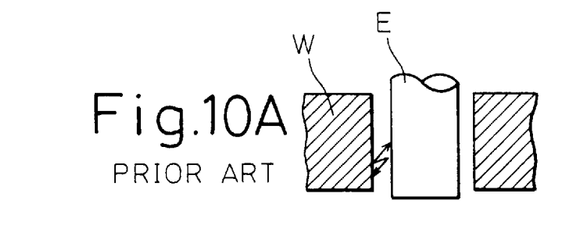
Figure 10B:
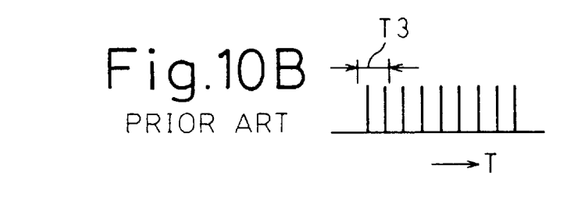
Figure 11A:
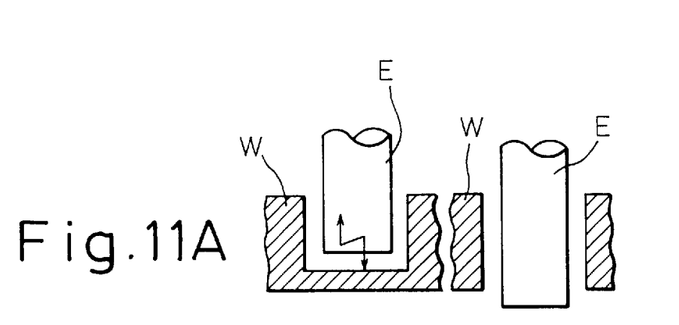
Figure 11B:
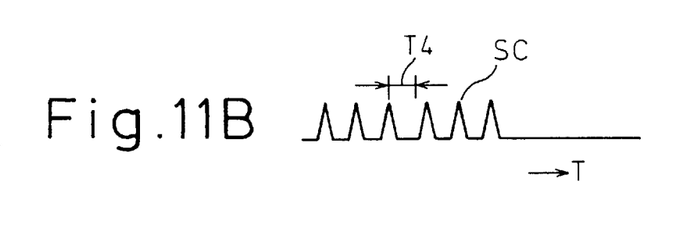

FIGS. 8A to 11B are views for comparing the prior art with the present invention. In these drawings, FIGS. 8A to 10B represent the prior art, and FIGS. 11A and 11B show the present invention. Further, in these drawings, FIGS. 8A, 9A, 10A and 11A show the relationship in position between the electrode and the workpiece, and FIGS. 8B, 9B, 10B and 11B show either the discharge current or the short-circuit current changing with time.

Figure 8A:
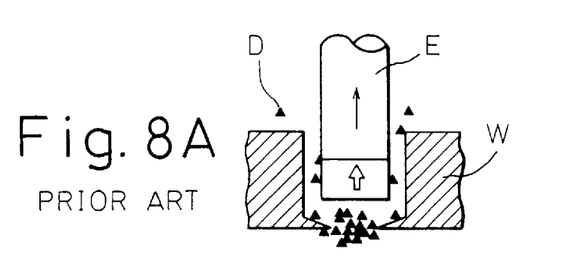
Figure 8B:
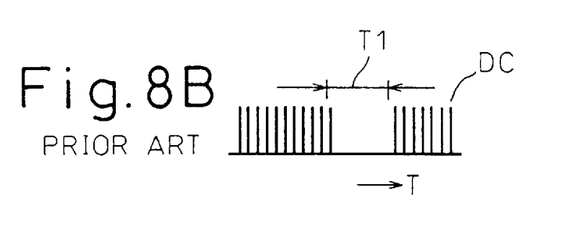

In FIGS. 8A and 8B, when the electrode E temporarily backs away during electric-discharge machining as shown by an arrow, the discharge current DC between the electrode E and the workpiece W is also temporarily cut-off during a time interval T1 (about 0.1 second or less) as shown in FIG. 8B.

That is, the machining dust D is jammed between the electrode E and the workpiece W. In this case, in order to avoid the short-circuit between the electrode E and the workpiece W caused by the machining dust D, the distance therebetween is controlled so as not to produce a short-circuit. However, although it is possible to avoid the short-circuit, the discharge current is temporarily cut-off for an instant when the electrode backs to the arrow direction as mentioned above.

In FIGS. 9A and 9B, when the electrode feeding apparatus employs the piezoelectric element, the electrode E vibrates in a traverse direction due to vibration of the piezoelectric element. Accordingly, a side surface of the electrode E contacts the workpiece W in synchronization with the traverse vibration of the piezoelectric element. As a result, the short-circuit current SC having the low frequency T2, for example, about several tens of Hz or less, flows between the electrode E and the workpiece W for an instant when the electrode contacts the workpiece.

In FIGS. 10A and 10B, after the electrode E has penetrated the workpiece W, the discharge current DC having high frequency T3, about 1 MHz, is also generated between the electrode E and the workpiece W. This discharge current DC flows between the side surface of the electrode E and an inner surface of the workpiece W.

As is obvious from the above explanations, in the conventional art, waveforms shown in FIGS. 8B, 9B and 10B are observed during electric-discharge machining. Further, waveforms shown in FIGS. 9B and 10B are observed after the electrode has penetrated the workpiece.

In FIGS. 11A and 11B, these drawings show the present invention. As shown in the drawings, the electrode E vibrates in longitudinal direction so that the short-circuit current SC having the low frequency T4, for example, about 300 Hz is generated between the electrode E and the workpiece W during electric-discharge machining. Further, after the electrode E has penetrated the workpiece W, the short-circuit current is stopped as shown in FIG. 11B.

As obvious from the above explanations, in the present invention, waveforms shown in FIGS. 8B, 9B, 10B and 11B are observed during electric-discharge machining. Further, waveforms shown in FIGS. 9B and 10B are observed after the electrode E has penetrated the workpiece W.

In the above-explained first and second embodiments, the explanations were provided for the electrode feeding apparatus moving the electrode in accordance with expansion and contraction of the piezoelectric element. Further, it is possible to provide explanations for the electrode feeding apparatus moving the electrode with the electrode holder which holds the electrode.

Still further, in the structure which holds the electrode by using the electrode holder, it is possible to provide the higher precision of detection of penetration by the electrode by adding the structure which includes the control method in such a way that the electrode is contacted to the workpiece before electric-discharge machining, the position of the electrode holder is set to the starting point, and the determination is performed as the electrode has penetrated the workpiece when the electrode holder moved from the starting point in accordance with the thickness of the workpiece during machining, in addition to the structure which detects penetration of the electrode based on the occurrence frequency of the short-circuit current.

We claim:

1. An electrode feeding apparatus for electric-discharge machining by producing electric discharges between an electrode and a workpiece while the electrode is advanced stepwise into the workpiece and short-circuit current having an occurrence frequency flows between the electrode and the workpiece in order to machine the workpiece comprising:

an occurrence frequency detecting means for detecting the occurrence frequency of short-circuit current flowing when the electrode contacts the workpiece; and a penetration detecting means for detecting penetration of the electrode through the workpiece based on the occurrence frequency by detecting a reduction of the occurrence frequency of the short-circuit current after the electrode has penetrated the workpiece.

2. An electrode feeding apparatus as claimed in claim 1 wherein the penetration detection means additionally detects penetration of the electrode through the workpiece in such a way that the electrode contacts the workpiece before electric-discharge machining, a contact point on the workpiece corresponds to a position of an electric holder which holds the electrode, the position of an electric holder is set as a starting point of measurement and the penetration detecting means determines penetration by the electrode when the electric holder moves over a thickness of the workpiece to be machined from the starting point during electric-discharge machining.

* * * * *